(No Model.)  5 Sheets—Sheet 1.

W. A. LORENZ.
PAPER BAG MACHINE.

No. 591,174. Patented Oct. 5, 1897.

Fig. 1

Witnesses:
Jennie Nellis
A. S. Howe

Inventor:
William A. Lorenz
By his Attorney
W. H. Honiss (No Model.) 5 Sheets—Sheet 4.

W. A. LORENZ.
PAPER BAG MACHINE.

No. 591,174. Patented Oct. 5, 1897.

Witnesses:
Jennie Nellis
A. S. Howe

Inventor:
William A. Lorenz
By his Attorney
W. H. Honiss

(No Model.)　　　　　　W. A. LORENZ.　　　　5 Sheets—Sheet 5.
PAPER BAG MACHINE.

No. 591,174.　　　　　　　　Patented Oct. 5, 1897.

Witnesses:

Inventor:
William A. Lorenz
By his Attorney

UNITED STATES PATENT OFFICE.

WILLIAM A. LORENZ, OF HARTFORD, CONNECTICUT, ASSIGNOR TO ALBERT H. WALKER, TRUSTEE, OF SAME PLACE.

PAPER-BAG MACHINE.

SPECIFICATION forming part of Letters Patent No. 591,174, dated October 5, 1897.

Application filed January 6, 1897. Serial No. 618,202. (No model.)

*To all whom it may concern:*

Be it known that I, WILLIAM A. LORENZ, a citizen of the United States, residing at Hartford, in the county of Hartford and State of Connecticut, have invented certain new and useful Improvements in Paper-Bag Machines, of which the following is a full, clear, and exact specification.

The object of this invention is to provide a rapidly-running automatic machine for forming in the upper or mouth end of the side tucks of bellows-sided paper bags certain reversed folds which are shown and described in Letters Patent of the United States to H. M. Farnsworth, No. 355,010, dated December 28, 1886.

This invention may be embodied in an independent machine by providing it with a suitable driving-pulley and by providing means for feeding the blanks or bags to it in proper sequence and register; but I prefer to embody the invention in a machine which operates as an auxiliary in conjunction with a machine for folding the bottoms of paper bags from bellows-sided blanks, thus embodying in a single organization an automatic machine for rapidly manufacturing bellows-sided paper bags having these improved mouth folds. When thus employed in such an organization, the machine of my present invention may perform its operations upon the blank before the latter passes to the mechanism for forming the bottom folds, or it may, as herein shown, receive the bags from that bottom-folding mechanism.

Fig. 7 represents the devices in position ready to commence their operations upon the blank which has just been seized between the defining-plates. In Fig. 8 the extreme end of the bag has been started open by the lifter. In the lower portion of Fig. 2 these devices are shown in the position occupied by them when the mouth is fully opened and the tucks are fully spread. In Fig. 9 the folder-blade is shown to be near the completion of its folding movement, the distender and tuck-spreaders being withdrawn.

My invention is herein shown and described as being embodied in a machine which is adapted to operate in conjunction with the paper-bag-making machine shown and described in United States patent to W. A. Lorenz and W. H. Honiss, No. 361,951, dated April 26, 1887, the feed-rolls 329 and 330 of my present machine being mounted upon the shafts 324 331, driven by the gears 325 and 332, respectively, all arranged and operating in the same manner as the correspondingly-designated parts of the machine shown in that patent. The bags as they pass between the feed-rolls 329 and 330 are deflected alternately to the two sets of my improved folding devices by means of the oscillating deflector 20, which is mounted upon the fixed cross tie-rod 21. That deflector is provided with an arm 22, which by means of the spring 23 is held into engagement with the cam 24 on the cam-shaft 25.

As hereinafter explained, the feed-roll 329 makes two rotations for each rotation of the cam-shaft 25, and therefore two bags are fed into the apparatus at each rotation of the cam 24, which is so formed as to move the deflector alternately into engagement with each of the rolls 325 and 330, thus deflecting the succeeding blanks alternately to the two sets of folding devices. These two sets of folding devices are substantially identical in all respects, and therefore upon the drawings and in the following detailed description the numerals which are employed to designate the several parts of the upper set of folding devices will, with the addition of the exponent letter $a$, be employed to designate the corresponding parts of the lower set of folding devices.

The cam-shafts 25 $25^a$ are journaled in the side frames 26 and 27 of the machine and are connected by means of their gears 28 $28^a$ with the gear 325 on the shaft 324, by means of which the following devices are driven: As the gear 325 is one-half the diameter of the gears 28 $28^a$ the latter gears will each make one rotation and their respective folding devices will each operate once for two rotations of the feed-roll 329, thus conforming to the relative number of blanks or bags received from their feed-roll by each of the folding devices.

Figure 2:
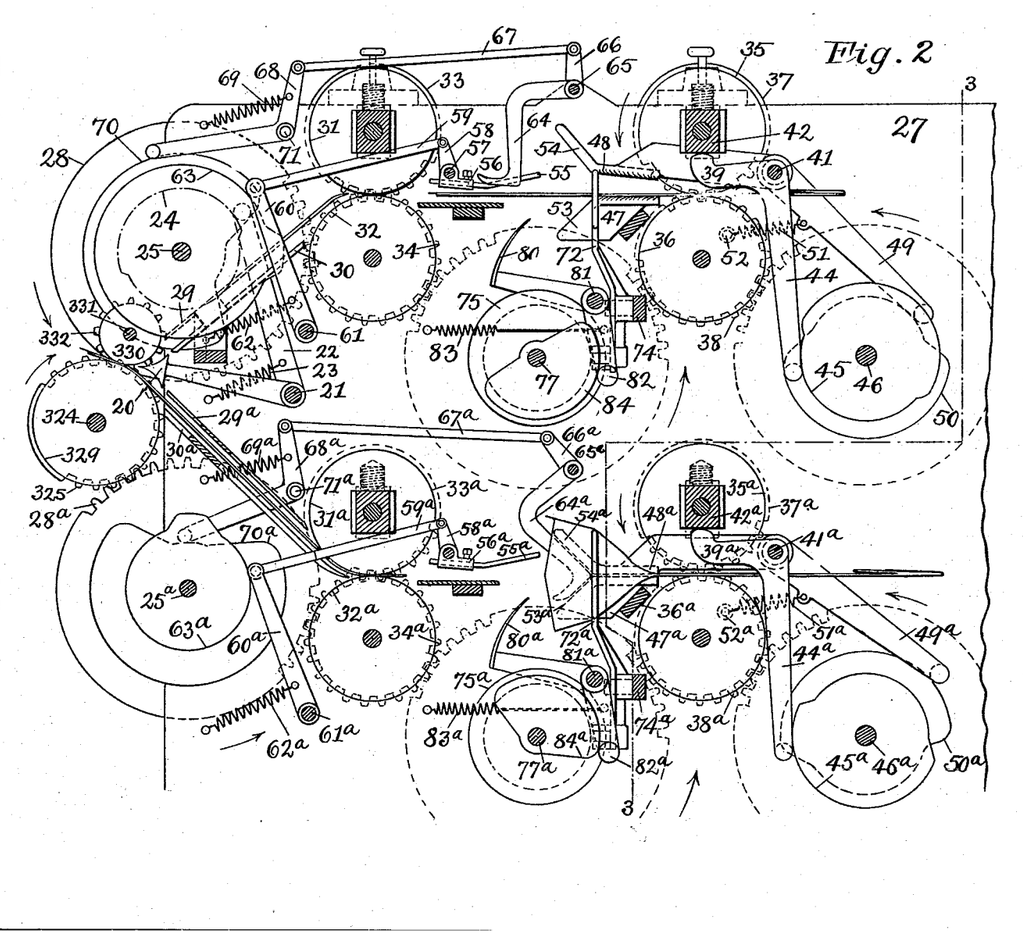
Fig. 2 is a side view thereof in section, taken on the line 2 2 of Fig. 1.

The alternate bags which are deflected to the upper set of folding devices pass between the plates 29 and 30, to and between the transferring-rolls 31 32, which are journaled in the side frames 26 and 27, and are connected with the train of gearing by means of their respective gears 33 34. The bags are fed by means of these rolls into the bite of the delivery-rolls 35 and 36, which are similarly journaled in the side frames 26 and 27 and connected with the train of gearing by means of the gears 37 38. Preferably both of the upper rolls 31 and 35 are journaled in yielding boxes, as shown in Fig. 2, provided with springs and tension-screws in the well-known manner, by means of which the pressure of those rolls against their coacting lower rolls may be adjusted. The upper delivery-roll 35 is adapted to be raised out of contact with the roll 36 at suitable periods by means of the arms 39 and 40, fixed upon the shaft 41, which is journaled at its ends in the side frames 26 and 27, those arms engaging beneath the journal-boxes 42 43 of the upper roll 35. One of the arms, as 39, is provided with a cranked extension 44, which engages with the cam 45 on the shaft 46, that cam being so formed as to raise the roll 35 from its position shown in Fig. 2 to that occupied by the roll $35^a$ in the same figure during the time that my improved folding devices are performing their operations upon the bag.

The fixed defining-plate 47 is located beneath the folding position of the bag, the extended ends thereof being attached to and forming a cross-brace between the side frames 26 and 27. The upper or movable defining-plate 48 is mounted to oscillate freely upon the shaft 41, and is provided with the cam-arm 49, which engages with the cam 50 on the cam-shaft 46, being held into contact therewith by means of the spring 51, attached between the arm 49 and the post 52. The cam 50 is so shaped as to move the upper defining-plate 48 from the position occupied by it in Fig. 2 to that occupied by the defining-plate $48^a$ in the same figure, serving also when in the latter position in the added capacity of a presser-plate for the bag while my improved folding devices are operating upon it.

Figure 1:
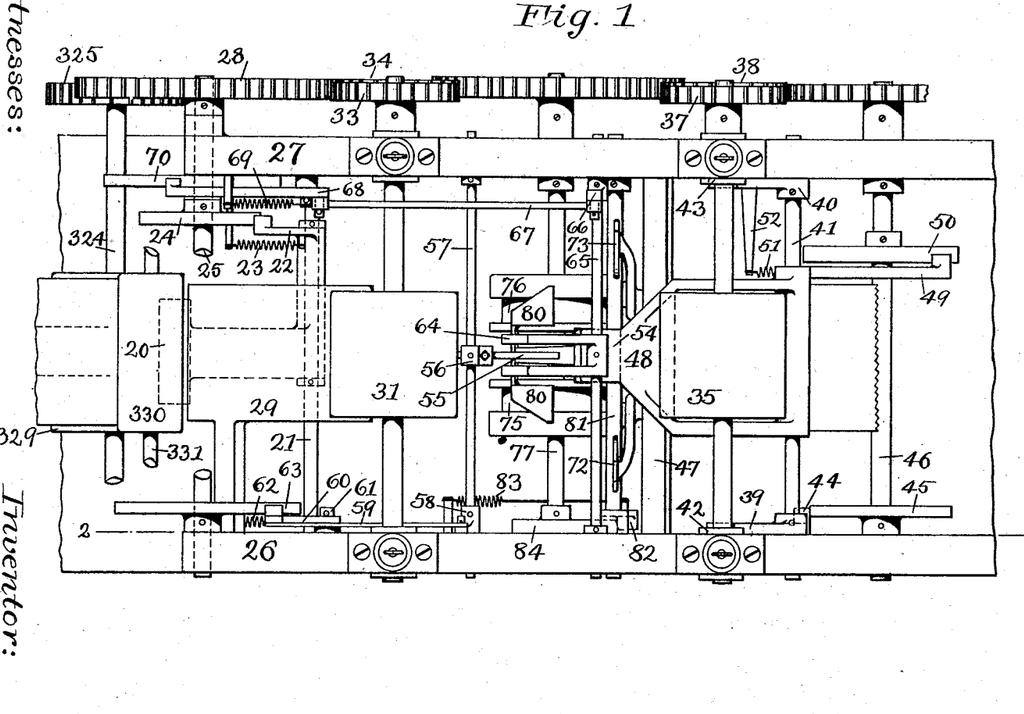
Figure 1 of the drawings is a plan view of my improved machine.

The movable defining-plate 48 is provided with an opening large enough to enable the delivery-roll 35 to extend through it into engagement with its coacting lower roll 36, as best shown in Figs. 1 and 2. The rearward transverse meeting edges $47^b$ $48^b$ of the plates 47 and 48 are adapted to coincide with and define the line $u$ of the blank of Fig. 4, and of Figs. 13 to 16, inclusive. From the ends of these transverse edges of the plates their meeting edges $47^c$ $48^c$ are forwardly inclined, making an angle of substantially forty-five degrees with the transverse edges $47^b$ $48^b$, thereby coinciding with and defining the lines $r$ $r$ of the bag of Fig. 4, upon which the upper and lower plies of the side tucks of that bag are folded away from each other in the operation of spreading the side tucks to the position shown in Figs. 14 and 15, these inclined edges of the plate serving thus to define the limit of the spread of those tucks.

Figure 4:
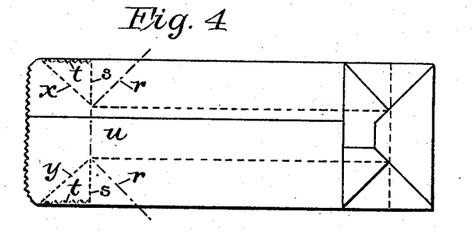
Fig. 4 is a plan view, and Fig. 5 an edge view, of a bellows-sided square-bottomed bag having its upper or mouth end folded in the form set forth in the above-mentioned Farnsworth patent.
Figure 5:
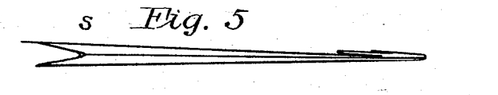

The transverse rearward meeting edges 47 48 of the defining-plates of Fig. 4 serve to define the limit of distention of the central portion of the mouth end of the bag, and the extreme rearward ends 53 54 of those plates are preferably inclined away from each other at the line of their transverse meeting edges, leaving an angular opening of substantially ninety degrees between them, as shown in Figs. 7 to 10, inclusive, thereby enabling the upper and lower sides of the mouth end of the bag each to be distended substantially forty-five degrees from the plane of the bag, or from their original position. (Shown in Fig. 7.)

As a preliminary means of slightly separating and opening the mouth of the bag to enable the distending and spreading devices to enter its plies with greater certainty I prefer to employ a lifting-finger 55, made longitudinally adjustable in its holder 56. That holder is fixed upon the shaft 57, which is pivotally mounted at its ends upon the side frames 26 and 27. This shaft and its finger are operated by means of the arm 58, connecting-rod 59, and cam-arm 60, the latter being pivotally mounted upon the stud 61 and pressed by means of the spring 62 into engagement with the cam 63 on the shaft 25. That cam is so formed as to hold the finger 55 above the plane of the bag while the latter is passing to its folding position, as shown in the upper portion of Fig. 2, and after the bag reaches the position shown in Fig. 7 the finger 55 is moved by its cam to the position shown in that figure, below the plane of the bag. It is then again raised, as shown in Fig. 8, so as to lift the upper ply of the mouth end of the bag slightly, thereby enabling the mouth-distender to enter with greater certainty, the finger remaining in its elevated position (shown in Fig. 9) until the next bag has been fed beneath it to the operative position shown in Fig. 7.

Figure 7:
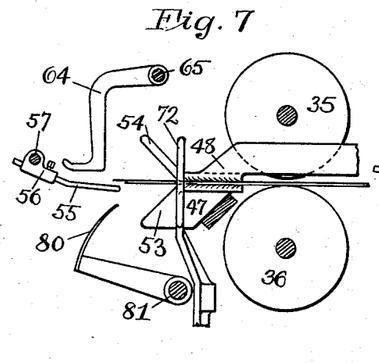
Figs. 7, 8, and 9 are diagrammatic views showing the outlines of the improved fold-forming devices of my present invention in three different positions occupied by them during their operation upon the blank, a fourth position of those devices intermediate to those shown in Figs. 8 and 9 being shown in the lower portion of the machine of Fig. 2, while a fifth position of those devices prior in time to the position shown in Fig. 7 is represented in the upper portion of Fig. 2. In the latter figure these devices are shown in their retracted position, the defining-plates being opened to allow a bag or blank to be fed to its folding position.
Figure 8:
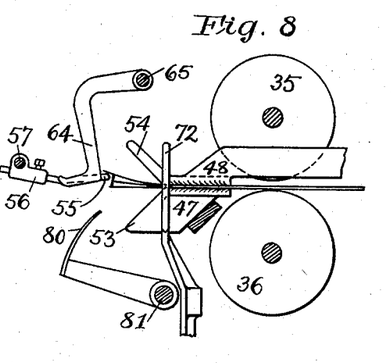
Figure 9:
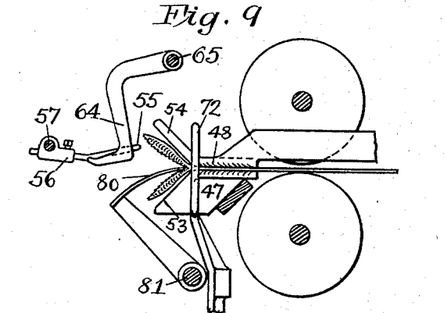
Figure 10:
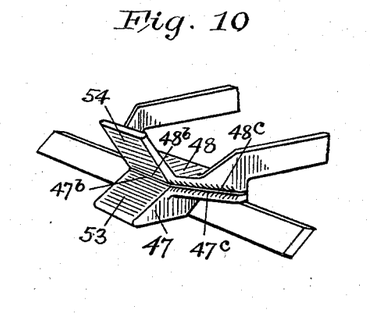
Fig. 10 is a perspective view of the defining-plates of my present invention, showing them in their closed position.
Figure 11:
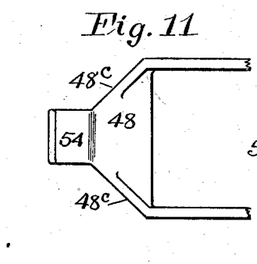
Figs. 11 and 12 are plan views of the upper and lower defining-plates, respectively.
Figure 12:
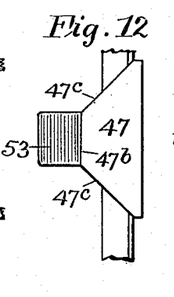

The distender 64 is preferably of the form shown in Figs. 7, 8, and 9, being bifurcated, as shown in Fig. 1, to enable it to pass on both sides of the lifting-finger 55. This distender is fixed upon the shaft 65, which is journaled at its ends in the side frames 26 and 27. That shaft and its distender are caused to oscillate by means of the cam 70, being connected therewith by means of the arm 66, the connecting-rod 67, and the cranked arm 68, pivotally mounted upon the stud 71. The cam-engaging portion of the cranked arm 68 is held by means of the spring 69 into engagement with the cam 70 on the shaft 25, and that cam is so formed as to move the distender 64 from its position shown in the upper portion of Fig. 2 to the position occupied by the distender 64 in the lower portion of that figure, thereby distending the central portion of the mouth end of the bag along the line $u$ thereof against the diverging ends 53 54 of the defining-plates, thereby enabling the tucks to be spread by the devices next to be described.

Figure 3:
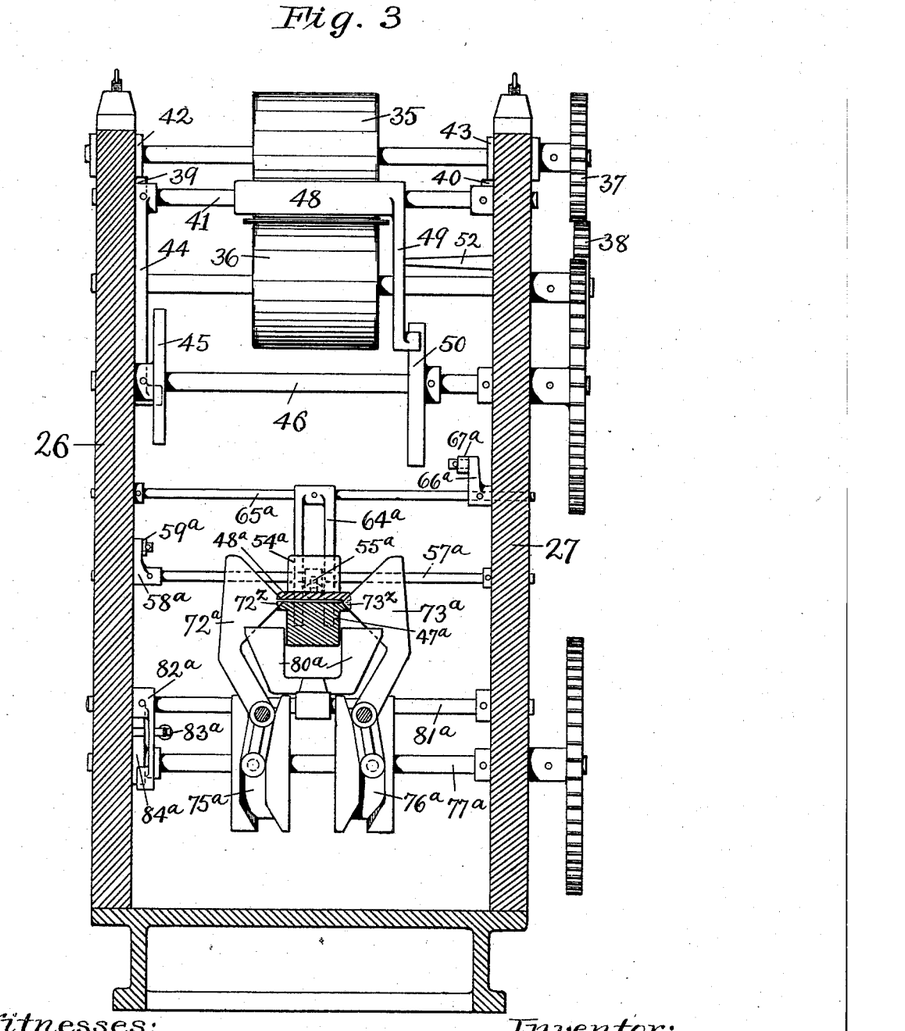
Fig. 3 is an end view in section taken on the line 3 3 of Fig. 2, looking from the right-hand side, as seen in the latter figure.

The oppositely-disposed tuck-spreaders 72 and 73 are pivotally mounted upon the cross-brace 74 of the machine, so as to be capable of oscillation laterally toward and from each other. The upper ends of these spreaders are provided with V-shaped bag-engaging portions located on opposite sides of the blank. The apexes $72^z$ $73^z$ of these V-spreaders face toward each other and are located substantially in the plane of the opening between the defining-plates 47 and 48, as best shown in Fig. 3. The lower ends of these tuck-spreaders are adapted to engage with the cams 75 76 on the rotating shaft 77, those cams being so formed as to cause the V-shaped bag-engaging ends of the spreaders to move laterally toward and from each other into and out of the side tucks of the bag, being shown in their innermost position in Figs. 14 and 16. The apexes $72^z$ and $73^z$ of the tuck-spreaders are located substantially in line with the rearward transverse meeting edges $47^b$ $48^b$ of the defining-plates, and therefore coincide with the apexes $z$ of the folds shown in Figs. 13 and 15. The angular edges of the flat tuck-spreaders 72 and 73 (shown in Figs. 1, 7, 8, and 9) come into contact with the inner sides of the tuck-plies of the bag substantially along the lines $v$ $w$ of Fig. 15, while the corresponding edges of the bent spreaders (shown in Figs. 16 and 17) come in contact with those plies along the lines $x$ $y$ of the bag of Fig. 13. The relative merits of these two forms of spreaders will be hereinafter more fully set forth, the operation of either form being to spread the side tucks upon the lines $r$ $r$ to a sufficient extent to flatten out and define the triangular plies $t$ $t$ of the bags of Figs. 13 and 15 in order to enable those plies to be reversed and refolded upon their original longitudinal central fold-lines $s$ $s$.

The folder 80 is fixed upon the shaft 81, which is journaled at its ends in the side frames 26 and 27, and has fixed upon it the cam-arm 82, which is held by means of the spring 83 into contact with the cam 84 on the rotating shaft 77. The upper or bag-engaging end of the folder 80 is in the form of a blade bifurcated in order to enable it to pass upon opposite sides of the distender when the latter is in the position occupied by the distender $64^a$ in the lower mechanism of Fig. 2, the bag being then in the form shown in Fig. 15. The bifurcated portions of the folder-blade 80 engage with the triangular plies $t$ of the bag at or near their longitudinal center lines $s$ $s$, reversely folding them upon those lines from the position shown in Fig. 15 to that shown in Fig. 9, in order that the plies may take the form shown in Fig. 6 when the bag is flattened.

A description will now be given of the mode of operation of the machine, it being presumed that the bags or the blanks, as the case may be, are fed at regular intervals to and between the feed-rolls 329 and 330, either from the bag-making machine or by means of any other suitable mechanism, the succeeding blanks or bags being deflected alternately to the upper and the lower sets of mechanism shown in Fig. 2. My description will follow the progress of a bag passing through the upper set of mechanism, it being understood that the alternate bags which are downwardly deflected are operated upon in a precisely similar manner by the lower set of mechanism.

Figure 6:
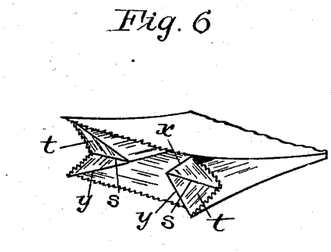
Fig. 6 is a perspective view of the upper end of the blank of Figs. 4 and 5, the mouth being partly distended in order to show its folds more clearly.
Figure 14:
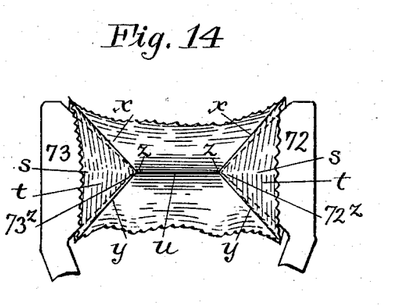
Fig. 14 is an end view of the blank with its tucks spread, showing also the tuck-spreaders in connection therewith.
Figure 15:
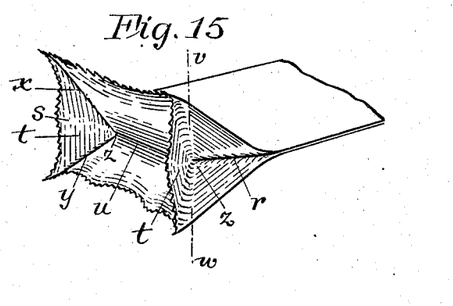
Fig. 15 is a perspective view of the blank of Fig. 13, representing the mouth end of the blank in the opened position assumed by it when the folding devices are in the position shown in the lower portion of Fig. 2.

The upwardly-deflected bags pass between the plates 29 and 30 to and between the transferring-rolls 31 and 32, by means of which they are fed forward into the bite of the delivery-rolls 35 and 36, the defining-plates, distender, and lifting-finger being then in the position shown in the upper portion of Fig. 2. As each bag reaches the position shown in Fig. 7 it is gripped between the defining-plates 47 and 48, the delivery-roll 35 being simultaneously raised out of contact with the bag. Meanwhile the lifting-finger 55 is moved to the position shown in Fig. 7, brushing past the projecting lip of the upper ply of the bag, and is then moved upward against that ply, as shown in Fig. 8, separating it from the lower ply and thereby enabling the heels of the bifurcated distender 64 to enter between those plies, distending the mouth of the bag against the diverging ends 53 and 54 of the defining-plates 47 and 48, as shown in the lower portion of Fig. 2. Then the tuck-spreaders 72 and 73 are moved toward each other into the side tucks of the bag, spreading them open, as shown in Figs. 14 and 15, unfolding the triangular plies $t\ t$ into the flattened form shown in Fig. 14. Then the bifurcated folder 80, which during the operations just described has been resting in the positions shown in Figs. 7 and 8, moves to the position shown in Fig. 9, doubling the triangular plies $t$ outwardly between the side tucks along their center lines $s\ s$, thus reversing them along their original longitudinal lines of fold. During the latter part of the movement of the folder 80 the tuck-spreaders 72 and 73 are retracted, being fully withdrawn from between the tucks when the folder-blade reaches the position shown in Fig. 9, in order to allow the tucked sides to close together upon the folded plies $t\ t$, as best represented in Fig. 6. The delivery-roll 35 is then allowed to drop into engagement with its coacting roll 36, thereby gripping the bag and drawing it from between the defining-plates, which at this time are only separated sufficiently to enable the blank to be drawn through, thereby pressing and fixing the new folds which have been made along the lines $s\ s$ of Fig. 4. The folder 80 is timed to follow in contact with the fold-lines $s\ s$ of the triangular plies $t\ t$ a short distance between the plates until those plies have been safely flattened, in order to prevent them from being pushed back and distorted. Those folded plies are still more completely flattened in passing between the delivery-rolls 35 and 36, by means of which the completed bag is fed to a drier or to suitable receiving devices, or in cases where the blanks are thus operated upon in advance of the bottom-folding operation they are fed by the delivery-rolls 35 and 36 to suitable mechanism for performing those bottom-folding operations.

Figure 13:
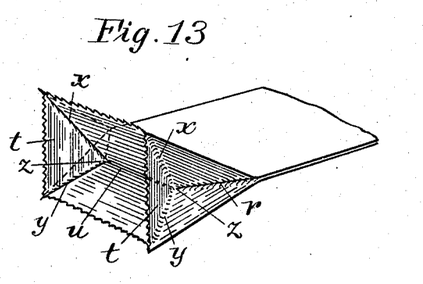
Fig. 13 is a perspective view of the mouth end of the bag or blank, showing the plies in the position which would be assumed by them if it were possible to stretch them so tightly by means of the opening and the spreading devices as to sharply define their lines of fold $r\,x\,y$, the plies of the side tucks on each side forming the side walls of a three-sided pyramid, having its base at the side edge of the tube and its apex $z$ at the point where the new fold-lines intersect the original inner fold-line of the tucked sides of the blank.
Figure 16:
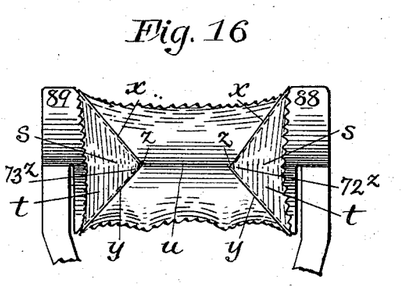
Fig. 16 is an end view, and Fig. 17 a side view, of a blank with its tucks spread, showing in connection therewith a modified form of tuck-spreader, the blank-engaging edges of which conform approximately to the lines of fold $x$ and $y$ of Figs. 13 and 15.
Figure 17:
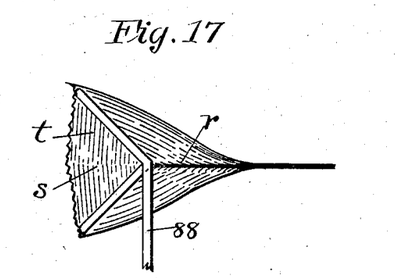

The tuck-spreaders 88 and 89 shown in Figs. 16 and 17 differ from those shown in the other figures in the respect that their blank-engaging portions are bent, as shown in Fig. 17, so as to bring their V-shaped blank-engaging edges into substantial coincidence with the lines $x$ and $y$ of the blank of Fig. 13, thereby serving to define the precise location of those fold-lines. When this form of tuck-spreader is employed, it will be necessary to commence their retraction simultaneously with the engagement of the folder 80 against the plies $t\ t$, inasmuch as that tuck cannot be reversed to any considerable extent while tightly distended, as shown in Fig. 13. Therefore while the form of spreaders shown in Figs. 16 and 17 may seem at first sight to be more suited to the function they are to perform, it will be found that in the practical performance of these operations upon the blank the flat form of spreaders shown in the other figures is preferable, inasmuch as those spreaders engage with the blank substantially along the lines $v\ w$ of Fig. 15, at a considerable angle from the lines $x\ y$, thereby leaving the paper adjacent to the plies $t\ t$ somewhat loose and elastic, as shown in Figs. 2 and 14, in order that those plies may be reversed more readily without tearing the paper and without the necessity of timing the relative movements of the spreaders and of the folder so accurately to each other as would be required in the employment of the spreaders shown in Figs. 16 and 17. In practice it is found to be sufficient to spread the tucks to the form shown in Fig. 15, without accurately defining the lines $x\ y$, by means of the edges of the spreaders, inasmuch as those lines are sufficiently well defined by the lines of strain running from the apexes $z$ to the corners formed by the junction of the outer edges of the plies $t\ t$ with the upper and lower plies of the blank. When these devices are employed in the folding of blanks which are not long enough to reach from the feeding-rolls 329 and 330 to the transferring-rolls 31 and 32, or when for any reason those transferring-rolls are located at a distance from the feeding-rolls greater than the length of the blank, suitable carrying-tapes driven by those rolls or driven by means of independent rolls may be substituted for the guide-plates 29 and 30.

In operating upon blanks or bags which have been made without sharply creasing or flattening the outside edges the lifting-finger 55 may sometimes be dispensed with, inasmuch as the rounded uncreased edges of such a blank will, when gripped between the defining-plates 47 and 48, cause a distention of the mouth of the bag or blank sufficient to enable the distender 64 to enter with a sufficient degree of certainty; but I prefer to employ this lifter in all cases where in the prior manipulation of the bag or blank its outside edges are liable to become flattened, so as to prevent a suitable or sufficient distention of its mouth. It is not essential, however, that it should be located above the path of the blank, as it will operate equally well when located below that path.

The plates 47 and 48 perform a threefold function in this machine: first, to support and retain the blank in position while the other folding devices are performing their operations; secondly, to define, at least approximately, the extent to which the mouth end of the bag or blank and the side tucks are to be distended or spread; third, to operate in conjunction with the delivery-rolls 35 and 36 to flatten the newly-made folds of the blank as the latter is drawn between the plates by those rolls. These plates 47 and 48 are herein designated as "defining-plates," but it is not thereby to be assumed that they necessarily define the lines of fold sharply. The meeting edges of these plates need not be sharp, but should be rounded somewhat in order to avoid marking or tearing the blank; nor is it an essential feature that the inclined edges $47^c$ $48^c$ shall be at an angle of forty-five degrees with the transverse edges $47^b$ $48^b$ of those plates, although it will be found in practice that the folds will be made with greater ease, accuracy, and certainty when the plates are constructed and arranged substantially as herein set forth.

I claim as my invention—

1. A defining-plate having inclined side edges for defining the lines $r, r$, at or near the mouth end of a paper-bag blank, for the purpose specified.

2. A pair of defining-plates arranged on opposite sides of a paper-bag blank, provided with inclined edges for defining the lines $r, r$, upon each side thereof.

3. A pair of defining-plates arranged on opposite sides of a bellows-sided paper-bag blank, having coinciding transverse defining edges for defining the extent of distention of the mouth end of the blank, and having inclined edges on each side thereof for defining the limits of the spread of the side tucks, for the purpose specified.

4. A pair of defining-plates for engaging the opposite sides of a paper-bag blank, provided with outwardly and oppositely extending portions for limiting the angular distention of the mouth of the blank, substantially as described.

5. In combination with means for engaging the opposite sides of a bag-blank, and for defining the limit of distention thereof, a distender for entering and distending the blank.

6. The combination of defining-plates for engaging the opposite sides of a paper-bag blank, and defining therein the longitudinal limit of distention, the ends of the plates being turned outwardly from the blank to substantially an angle of forty-five degrees therefrom, and thus limiting the angular extent of the distention, a distender arranged adjacent thereto, and operating to enter the mouth of the blank and distend its sides, substantially as described.

7. The combination of defining-plates for defining and limiting the extent of distention of a paper-bag blank, a distender arranged to enter the mouth of the blank and distend it, and a laterally-swinging lifter for initiating the opening movement of the blank to enable the distender to enter.

8. Means for spreading the side tuck of a bellows-sided bag-blank, consisting of a V-shaped plate arranged transversely to the blank with its apex in the plane thereof, the angle formed by the edges of the V-plate being substantially equal to the angle to which the tucks are to be spread, substantially as described.

9. Means for spreading the side tucks of a bellows-sided bag-blank, consisting of a pair of V-shaped plates disposed at opposite edges of the blank, and arranged transversely thereto, the apexes of the V-shaped plates being located substantially in the plane of the blank.

10. Means for spreading the side tucks of a bellows-sided bag-blank, consisting of a pair of V-shaped plates disposed at opposite edges of the blank, and arranged transversely thereto, the apexes of the V-shaped plates being located substantially in the plane of the blank, with means for moving the plates laterally into and out of the side tucks.

11. In combination with means for supporting the blank and for defining therein the line $r$, upon which the tucks are to be spread open, a tuck-spreader having a V-shaped portion arranged transversely to the blank, with its apex substantially in the plane thereof, with means for moving the spreader into and out of the tucked side of the blank.

12. In combination with means for supporting the blank and for defining therein the lines $r, r$, upon which the tucks are to be spread open, a pair of tuck-spreaders arranged transversely to the blank at the opposite edges thereof, the blank-engaging edges of the spreaders being at an angle substantially equal to that of the desired spread of the tucks.

13. The combination of a V-shaped tuck-spreader for opening and flattening the triangular ply $t$, with a folder-blade for reversing that ply by refolding it in the opposite direction, substantially as described.

14. In combination with means for supporting the bag-blank, oppositely-disposed transversely-arranged V-shaped tuck-spreaders for opening and flattening the triangular plies $t$, and a folder for reversing those plies by refolding them in the opposite direction between the tucks of the blank, substantially as described.

15. In combination with plates for supporting the blank and for defining therein the lines $r, r$, and $u$, oppositely-disposed tuck-spreaders arranged transversely to the blank, and substantially in line with those edges of the defining-plates which are to define the line *u*, a distender for distending the mouth of the blank upon the line *u*, and a folder for reversing and refolding the triangular plies *t* upon their lines *s*.

16. In combination with means for supporting a bag or blank, a defining-plate, means for holding it against the blank with suitable pressure, and means for engaging with the blank and drawing it from beneath the plate, all arranged and operating to smooth and flatten the folds in the blank, substantially as described.

17. The combination of defining-plates arranged on opposite sides of the blank, means for engaging with and drawing the blank from between the plates, and means for controlling the amount of separation between the plates, whereby they are made to engage with suitable pressure against the blank which is being drawn between them, substantially as described.

18. In combination with means for supporting a bag or a blank, a defining-plate, means for moving it against the blank and its support with suitable pressure, means for engaging with the blank and for drawing it from the plates, and a folder for following the blank to and between the defining-plate and the support, substantially as described.

WILLIAM A. LORENZ.

Witnesses:
JENNIE NELLIS,
W. H. HONISS.